(12) United States Patent
Ishikawa

(10) Patent No.: US 6,557,531 B2
(45) Date of Patent: May 6, 2003

(54) THERMAL TYPE AIR FLOW METER

(75) Inventor: Hitoshi Ishikawa, Hitachinaka (JP)

(73) Assignees: Hitachi, Ltd., Tokyo (JP); Hitachi Car Engineering Co., Ltd., Hitachinaka (JP)

( * ) Notice: Subject to any disclaimer, the term of this patent is extended or adjusted under 35 U.S.C. 154(b) by 0 days.

(21) Appl. No.: 09/970,897

(22) Filed: Oct. 5, 2001

(65) Prior Publication Data

US 2002/0014222 A1 Feb. 7, 2002

Related U.S. Application Data

(62) Division of application No. 09/254,150, filed on Feb. 26, 1999, now Pat. No. 6,354,275.

(30) Foreign Application Priority Data

Sep. 13, 1996 (WO) ................................ PCT/JP96/02628

(51) Int. Cl.[7] .............................................. F02M 51/00
(52) U.S. Cl. ..................................... 123/488; 73/118.2
(58) Field of Search ................................ 123/488, 494; 73/118.2

(56) References Cited

U.S. PATENT DOCUMENTS

| | | | | |
|---|---|---|---|---|
| 4,589,279 A | * | 5/1986 | Mitsuyasu et al. .......... | 73/118.2 |
| 4,590,563 A | * | 5/1986 | Matsummura et al. ...... | 123/488 |
| 4,600,993 A | * | 7/1986 | Pauwels et al. ............. | 123/488 |
| 4,730,255 A | * | 3/1988 | Akiyama et al. ........... | 701/104 |
| 4,875,452 A | * | 10/1989 | Hara et al. ................... | 123/488 |
| 5,123,391 A | * | 6/1992 | Ohkubo et al. ............. | 123/435 |
| 5,517,971 A | * | 5/1996 | Nishimura et al. ......... | 123/494 |
| 5,544,079 A | * | 8/1996 | Saikalis ....................... | 702/86 |
| 5,988,140 A | * | 11/1999 | Gartner et al. .............. | 123/488 |
| 6,272,423 B1 | * | 8/2001 | Rekewitz .................... | 701/102 |
| 6,354,275 B2 | * | 3/2002 | Ishikawa .................... | 123/488 |

* cited by examiner

Primary Examiner—John Kwon
(74) Attorney, Agent, or Firm—Crowell & Moring LLP

(57) ABSTRACT

To perform with high accuracy the analog-to-digital conversion of signals of an air flow meter irrespective of fluctuation of a reference voltage of an analog-to-digital conversion circuit. A thermal type air flow meter including means for measuring an intake air flow rate by heating and controlling a heating resistor and means for performing analog-to-digital conversion of an air flow rate signal of the air flow rate measurement means, which inputs a reference voltage to the analog-to-digital conversion circuit so that the reference voltage can be converted from the analog signal to the digital signal by the analog-to-digital conversion circuit, and the air flow rate signal can be corrected in accordance with the value of the reference voltage. A/D conversion of the air flow rate signal can be executed accurately even when the voltage of the reference voltage source of the A/D converter in an electrical control unit is fluctuating.

8 Claims, 3 Drawing Sheets

THERMAL TYPE AIR FLOW METER

This application is a divisional of application Ser. No. 09/254,150, filed Feb. 26, 1999, now U.S. Pat. No. 6,354,275.

TECHNICAL FIELD

The present invention relates to a thermal type air flow meter, and particularly to an intake air flow meter for measuring an air flow rate taken into an internal combustion engine.

BACKGROUND ART

An analog-to-digital (A/D) conversion method of detecting an air flow rate taken into an internal combustion engine and then performing analog-to-digital conversion is disclosed, for example, in Japanese Patent Application Laid-Open No. 2-85724. This apparatus comprises an air flow rate detecting unit having a bridge circuit and detection circuit for detecting an air flow rate, and an electrical control unit having a circuit for converting the air flow rate signal to a digital signal. The feature of the prior art resides in that a circuit for correcting the air flow rate signal according to a reference voltage of an A/D conversion circuit is inserted between the A/D conversion circuit and the air flow detection circuit. Thereby, it is possible to accurately perform the analog-to-digital conversion of the air flow rate signal, since the air flow rate signal can be corrected according to the variation of the reference voltage of the A/D conversion circuit.

However, the method in which a circuit for correcting the air flow rate signal according to a reference voltage of an A/D conversion circuit is inserted between the A/D conversion circuit and the air flow detection circuit, is not a way in which a highly accurate A/D conversion can be obtained, because there is an error in the correction circuit itself.

Further, while a highly accurate constant voltage source is used as a reference voltage of the A/D conversion circuit, the constant voltage source slightly fluctuates. Further, when the drive circuit and the detection circuit for detecting an air flow rate are over the operating voltage, they do not depend upon the voltage of the voltage source. Therefore, the value of the air flow rate converted from an analog signal to a digital signal has an error due to the fluctuation of the reference voltage of the A/D conversion circuit. For example, assumed that the reference voltage of the A/D conversion circuit is Vcc, the number of bits in the A/D conversion circuit is 8 and the value of the digital conversion is Dafs, the conversion equation is as follows.

$$Dafs = Vafs/Vcc*256$$

Namely, owing to the reference voltage Vcc of the A/D conversion circuit, the converted value Dafs has an error.

DISCLOSURE OF INVENTION

An object of the invention is to provide an thermal air flow meter in which it is possible to perform with high accuracy the A/D conversion of an air flow rate signal, irrespective of the fluctuation of a reference voltage of an A/D conversion circuit.

To attain the above object, the present invention provides a thermal type air flow meter comprising a means for measuring intake air flow rate by controlling the heating of a heating resistor, and a means for performing the analog-to-digital conversion of the air flow rate signal of the air flow rate measuring means, wherein a reference voltage is input to the A/D conversion circuit and converted from an analog signal to a digital signal therein, and wherein the air flow rate signal is corrected according to the value of the reference voltage.

According to the present invention, it is possible to performing the A/D conversion of an air flow rate signal with high accuracy, even when the voltage of the reference voltage source of the A/D converter in an electrical control unit is fluctuating.

BEST MODE FOR CARRYING OUT THE INVENTION

Hereinafter, modes for carrying out the present invention will be explained with reference to the drawings.

Figure 1:
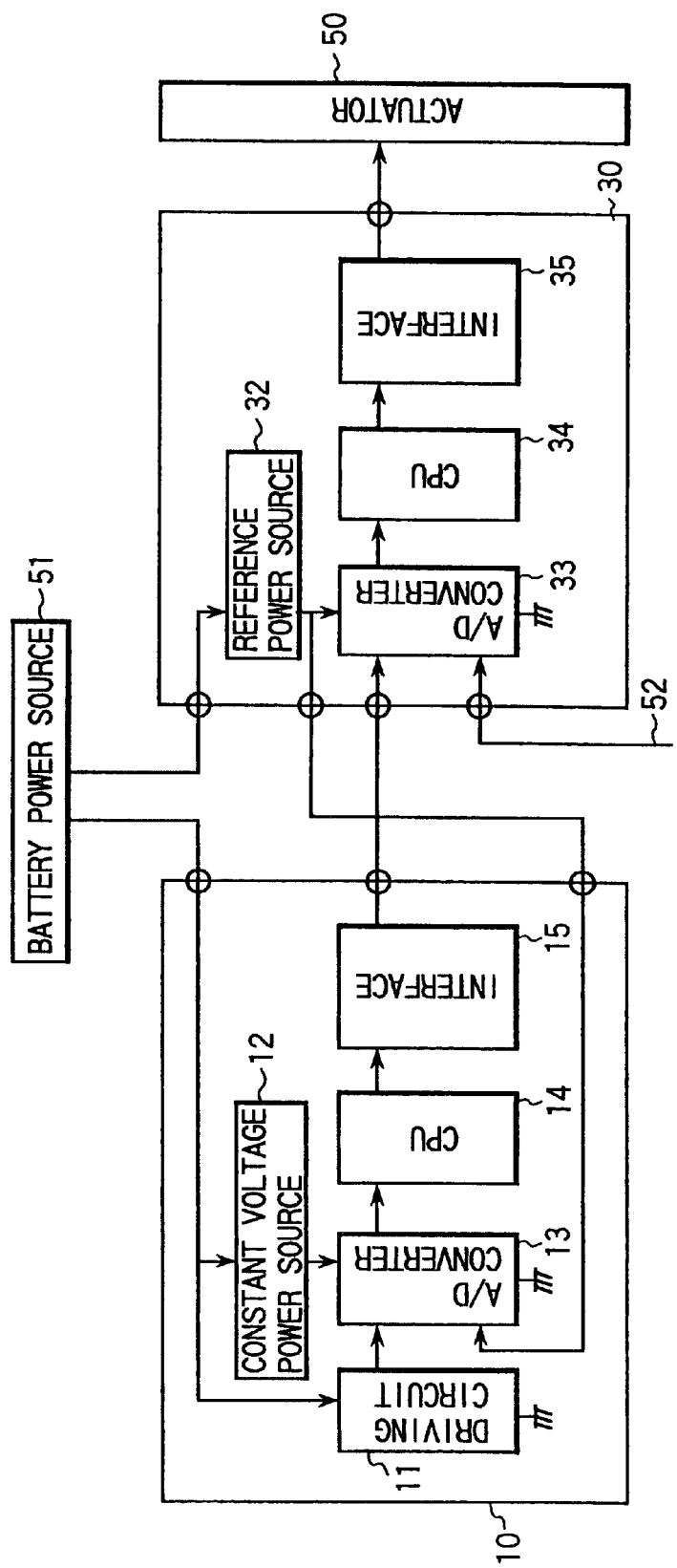
FIG. 1 is a block diagram illustrating an embodiment of the present invention.

FIG. 1 shows an intake air flow meter according to an embodiment of the present invention, in which a thermal type air flow meter, an electrical control unit and an actuator are shown in blocks.

Referring to FIG. 1, for example, a thermal type air flow meter 10 comprises a drive circuit 11 (a signal output means) for detecting an air flow rate signal of the air flowing through such as an intake pipe of an engine installed in a vehicle, an analog-to-digital (called as A/D) converter 13 for performing an A/D conversion of the air flow rate signal detected by the drive circuit 11, a central processing unit (called as a CPU) 14 for calculating the air flow rate signal converted from an analog signal to a digital signal, an interface 15 for converting the operated air flow rate signal into an analog signal, and a constant voltage source 12 for supplying a reference voltage to the A/D converter 13. The above conversion may be performed to a signal indicative of temperature of the intake air, because it is also possible to detect the temperature of the intake air along with the intake air flow rate. Further, the thermal type air flow meter 10 is connected to a battery power source 51 or power source for driving the drive circuit 11. The air flow rate signal or the air temperature signal from the thermal type air flow meter is supplied to an A/D converter 33 installed in an electrical control unit 30 (ex. an engine control unit ECU). Further, in the A/D converter 33, another analog signal 52 of the air flow rate signal is also input. The electrical control unit 30 includes the A/D converter 33, the CPU 34, the interface 35 and the reference voltage source 32, and controls the air flow rate signal from the thermal type air flow meter 10 or the operation of an actuator 50 (ex. a fuel injection valve for supplying the fuel to an engine, an ignition plug, and electronically controlled throttle) based on the air flow temperature signal. The reference voltage source 32 installed in the electrical control unit 30 is input to the A/D converter 13 installed in the thermal type air flow meter 10. Now, the voltage of the reference voltage source 32 is referred to as a reference voltage. By inputting the reference voltage to the A/D converter 13 and operating it with the A/D conversion value of the air flow rate signal detected by the drive circuit 11, it becomes possible to convert an air flow rate signal of the thermal type air flow meter with high accuracy even when the voltage of the reference voltage source 32 in the electrical control unit 30 fluctuates.

Figure 2:
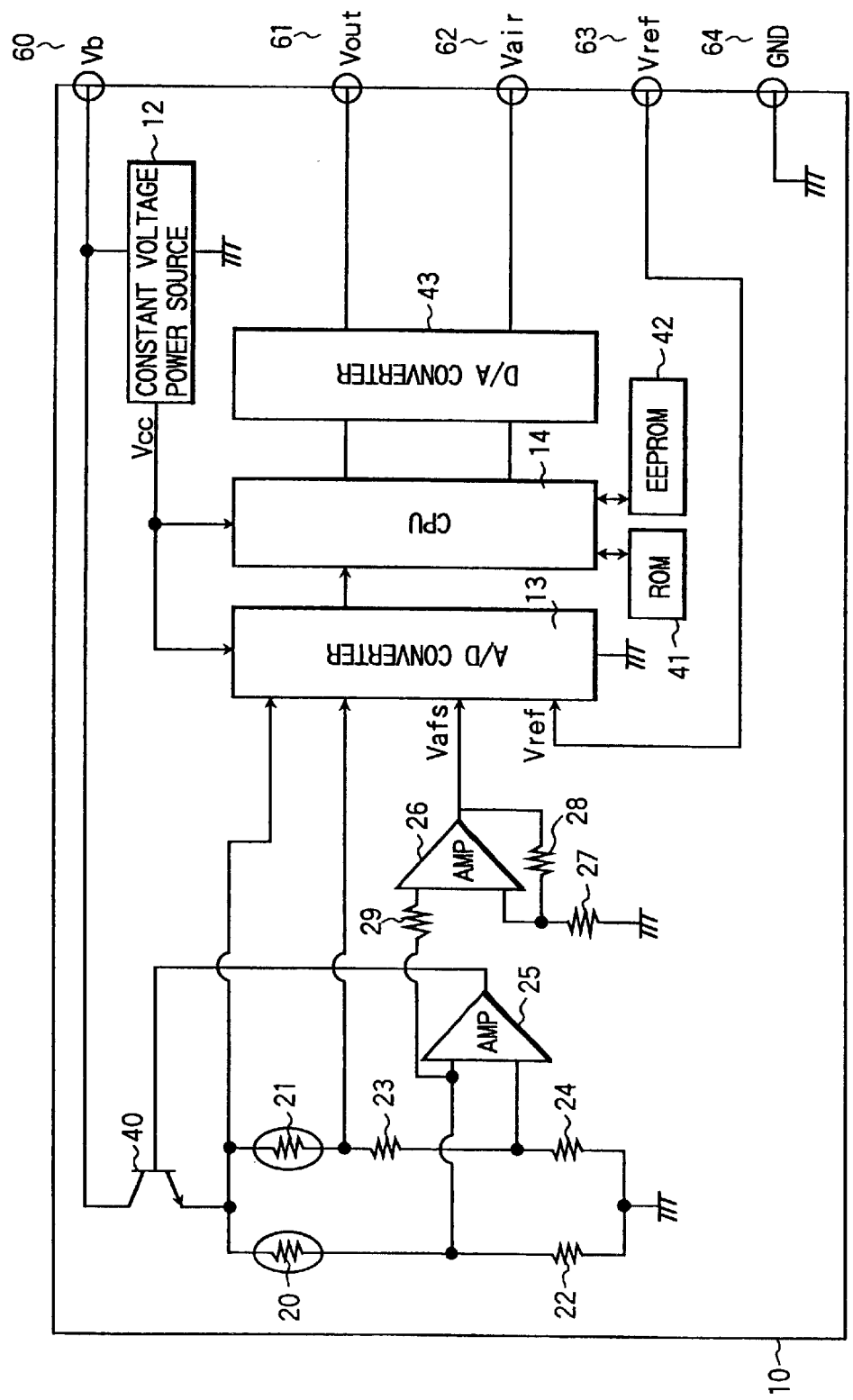
FIG. 2 is a detailed diagram of a thermal type air flow meter according to an embodiment of the present invention.

Referring to FIG. 2, an embodiment of the present invention will be explained in detail.

The thermal type air flow meter 10 has a drive circuit for detecting an air flow rate. The drive circuit comprises a heating resistor 20, a temperature-sensitive resistor 21, resistors 22, 23, 24, an amplifier 25 and a transistor 30. The air flow rate signal is further amplified by resistors 27, 28, 29 and an amplifier 26, and supplied to the A/D converter 13. A digital signal indicative of the air flow rate converted by the A/D converter 13 is digitally processed in the CPU 14. The processed signal is output as an air flow rate signal through the digital-to-analog (referred to as D/A) converter 33 to an air flow rate output terminal 61. The temperature of the intake air can be detected by the temperature-sensitive resistor 21, and used for the correction of the air flow rate according to the variation of the temperature of the intake air. The temperature of the intake air is digitally processed as an intake air temperature signal by applying the voltage across both ends of the temperature-sensitive resistor 21 to the A/D converter 13 and converting from an analog signal to a digital signal, and calculating a current flowing through the temperature-sensitive resistor 21 in the CPU 14. The processed signal is output through the D/A converter 33 to an air temperature output terminal 62 as an intake air temperature signal. The CPU 14 corrects the detected air flow rate signal or the air temperature signal based on the data stored in an EEPROM 32 and a ROM 31 in which data and programs are stored. While the D/A converter 43 is required when the A/D converter 33 of the electrical control unit 30 shown in FIG. 1 is used, it is not necessary to use when the processed signal is supplied digitally to the electrical control unit 30. It depends upon the form of the signal-transmission between the thermal type air flow meter 10 and the electrical control unit 30.

The reference voltage of the A/D converter 33 installed in the thermal type air flow meter 10 is supplied from the constant voltage source 12, and performed in the analog-to-digital conversion using the constant voltage Vcc as a reference voltage. Assumed that the number of bits in the A/D converter 13 is 8, and the voltage of the air flow rate signal detected by a heating resistor 20, etc. and amplified is Vafs, the value Dafs of the digital conversion is expressed as follows.

$$Dafs=Vafs/Vcc*256$$

Further, the voltage of the reference voltage source 32 installed in the electrical control unit 30 is applied through a reference voltage terminal 63 to the A/D converter 13. Assumed that the reference voltage is Vref, the air flow rate signal Vafs is further converted digitally according to the following equation in the CPU 14.

$$Dout=(Vafs/Vcc*256)*(AD(Vcc)/AD(Vref))$$

Where, AD(Vref) is the digital value obtained by converting the reference voltage of the reference voltage source 32 in the electrical control unit 32 in the A/D converter 13, and AD(Vcc) is the digital value obtained by converting the voltage of the constant voltage source 12 in the A/D converter 13 in a similar manner. If the number of bits of the A/D converter 13 is, for example, 8, it always indicates 256 which is $8^{th}$ power of 2.

Namely, the above equation can be further converted to the following equation.

$$Dout=AD(Vafs)*256)/AD(Vref))$$

This equation represents that even when the reference voltage of the reference voltage source 32 in the electrical control unit 30 fluctuates, it is possible to correct or compensate the air flow rate signal of the thermal type air flow meter in accordance with the magnitude of the fluctuation, by performing the A/D conversion to the voltage of the reference voltage source 32 and calculating.

Figure 3:
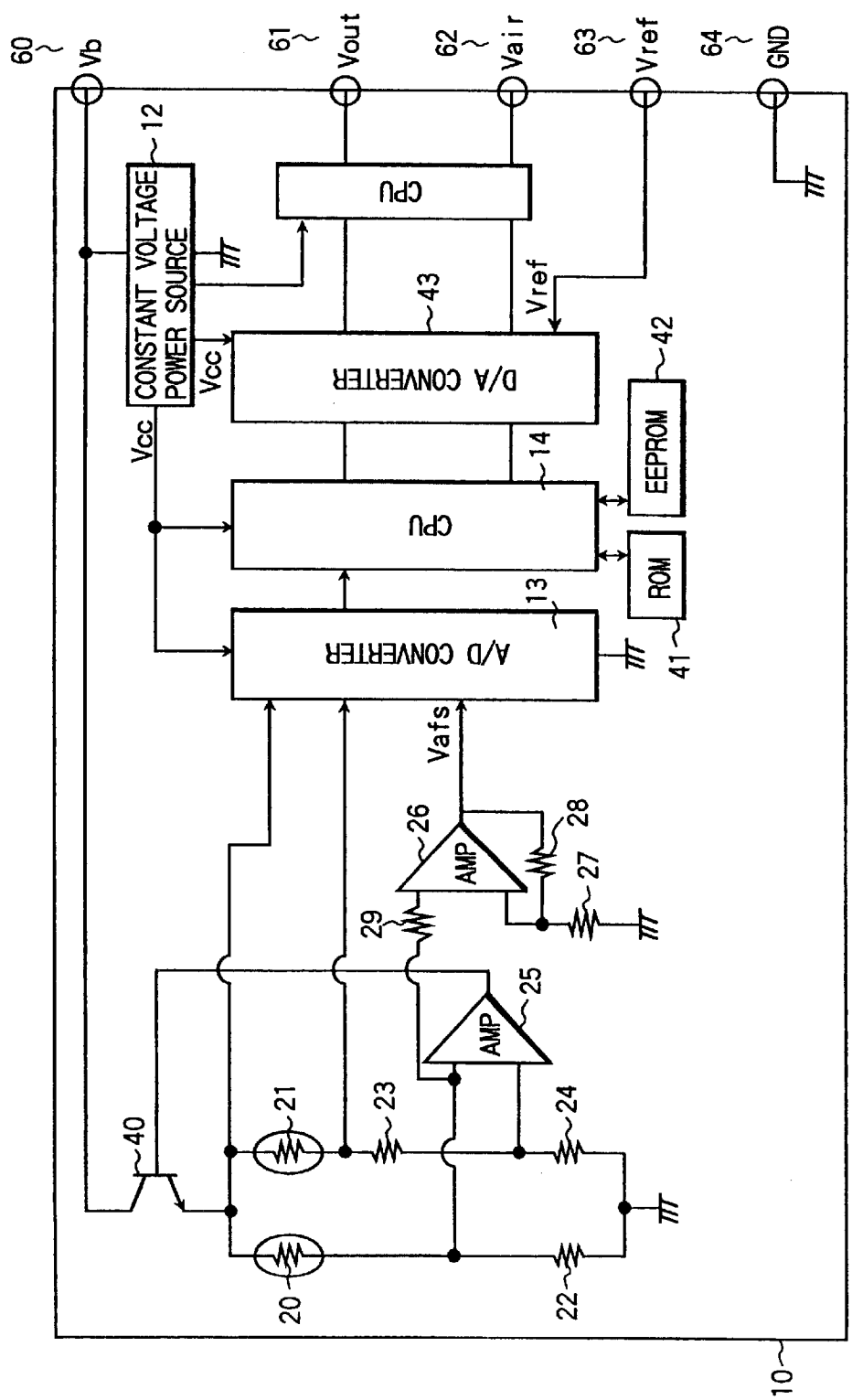
FIG. 3 is a detailed diagram of a thermal type air flow meter according to another embodiment of the present invention.

Another embodiment of the present invention will be explained. Even if the reference voltage of the reference voltage source 32 in the electrical control unit 30 is used as the reference voltage of the D/A converter shown in FIG. 2, it is possible to convert accurately the air flow rate signal detected by the drive circuit 11 (see FIG. 3).

What is claimed is:

1. A thermal type air flow meter comprising a means for outputting an air flow rate signal corresponding to the air flow rate flowing through a flow path by heating and controlling a resistor provided in the flow path, and a means for converting the air flow rate signal to a digital signal,
   wherein the air flow rate signal output from said digital conversion means is corrected by inputting a reference voltage to said digital conversion means.

2. A thermal type air flow meter according to n, wherein said reference voltage is a reference voltage of a second digital conversion means forming a control means for controlling an actuator by inputting a signal from the thermal type air flow meter.

3. A thermal type air flow meter according to claim 1, wherein said control means is an engine control unit (ECU) for controlling an engine for a vehicle, and said actuator is a fuel injection valve for supplying fuel to the engine.

4. A thermal type air flow meter comprising:
   (1) a means for outputting an air flow rate signal corresponding to the air flow rate flowing through a flow path by heating and controlling a resistor provided in the flow path,
   (2) a first digital conversion means for converting the air flow rate signal to a digital signal;
   (3) a constant voltage source for applying a constant voltage to said first digital conversion means;
   (4) a correction means for correcting a signal C obtained by digitally converting an output signal of said signal output means by said first digital conversion means by using,
      a signal A obtained by digitally converting a voltage signal of the reference voltage source in a control means by said first digital conversion means, the control means being comprised of a second digital conversion means for digitally converting an input signal, a reference voltage source for applying a voltage to said second digital conversion means, and a calculation means for calculating a control input of an actuator based on an output of said second digital conversion means, and
      a signal B obtained by digitally converting a voltage signal of said constant voltage source by said first digital conversion signal;
   (5) an output means for outputting a signal corrected by said correction means to said control means; and
      further comprising an analog conversion means for converting an input signal to an analog signal and outputting provided between said correction means and said output means.

5. A thermal type air flow meter comprising:
   (1) a means for outputting an air flow rate signal corresponding to the air flow rate flowing through a flow path by heating and controlling a resistor provided in the flow path, (2) a first digital conversion means for converting the air flow rate signal to a digital signal;

(3) a constant voltage source for applying a constant voltage to said first digital conversion means;

(4) a correction means for correcting a signal C obtained by digitally converting an output signal of said signal output means by said first digital conversion means by using, a signal A obtained by digitally converting a voltage signal of the reference voltage source in a control means by said first digital conversion means, the control means being comprised of a second digital conversion means for digitally converting an input signal, a reference voltage source for applying a voltage to said second digital conversion means, and a calculation means for calculating a control input of an actuator based on an output of said second digital conversion means, and a signal B obtained by digitally converting a voltage signal of said constant voltage source by said first digital conversion signal;

(5) an output means for outputting a signal corrected by said correction means to said control means;

wherein said control means is an engine control unit (ECU) installed in a vehicle, and said actuator is a fuel injection valve for supplying fuel to the engine.

6. A thermal type air flow meter comprising a means for outputting an air flow rate signal corresponding to the air flow rate flowing through a flow path by heating and controlling a resistor provided in the flow path, a means for converting the air flow rate signal to a digital signal, and an analog conversion means for converting the air flow rate signal digitally converted by said digital conversion means into an analog signal, wherein the air flow rate signal output from said analog conversion means is corrected by inputting a reference voltage to said analog conversion means.

7. A thermal type air flow meter according to claim 6, wherein said reference voltage is a reference voltage of a second digital conversion means forming a control means for controlling an actuator by inputting a signal from the thermal type air flow meter.

8. A thermal type air flow meter according to claim 7, wherein said control means is an engine control unit (ECU) for controlling an engine for a vehicle, and said actuator is a fuel injection valve for supplying fuel to the engine.

* * * * *